United States Patent [19]
Husain

[11] Patent Number: 5,594,288
[45] Date of Patent: Jan. 14, 1997

[54] LAMINATED ROTOR ASSEMBLY

[75] Inventor: Zaki D. Husain, Houston, Tex.

[73] Assignee: Daniel Industries, Inc., Houston, Tex.

[21] Appl. No.: 631,118

[22] Filed: Apr. 12, 1996

Related U.S. Application Data

[63] Continuation of Ser. No. 480,960, Jun. 7, 1995, abandoned, and Ser. No. 198,864, Feb. 18, 1994, abandoned.

[51] Int. Cl.$^6$ .............................. H02K 9/06; F03B 3/12; F04D 29/38
[52] U.S. Cl. ..................... 310/62; 310/63; 416/229 R
[58] Field of Search ..................... 310/62, 63, 40 MM, 310/216, 261; 416/202, 223 R, 229 R, DIG. 3

[56] References Cited

U.S. PATENT DOCUMENTS

| | | | |
|---|---|---|---|
| 1,142,690 | 6/1915 | Francke | 416/DIG. 3 |
| 1,396,680 | 11/1921 | Funk | 416/DIG. 3 |
| 2,023,111 | 12/1935 | Alsing | 416/DIG. 3 |
| 2,853,140 | 9/1958 | Forth, Sr. | 416/DIG. 3 |
| 3,659,959 | 5/1972 | Holstrom | 416/223 R |
| 5,083,904 | 1/1992 | Masatsugu et al. | 416/DIG. 3 |

FOREIGN PATENT DOCUMENTS 1-174244  12/1987  Japan .......................... H02K 17/16

Primary Examiner—Clayton E. LaBalle
Attorney, Agent, or Firm—Fish & Richardson P.C.

[57] ABSTRACT

A laminated rotor assembly is provided having a plurality of laminates, each of which has integral rotor blades. The rotor blades are angled at a predetermined amount with respect to a hub portion of the rotor assembly. The laminates are joined such that the laminated rotor assembly is closed.

19 Claims, 4 Drawing Sheets

5,594,288

LAMINATED ROTOR ASSEMBLY

This is a continuation of application Ser. No. 08/480,960, filed Jun. 7, 1995 now abandoned, and application Ser. No. 08/198,864, filed Feb. 18, 1994, now abandoned.

FIELD OF THE INVENTION

The invention relates generally to a rotor assembly and, in particular, to a laminated rotor assembly with rotor blade overlap.

BACKGROUND OF THE INVENTION

A variety of devices utilize rotor assemblies as driven or driving components. For example, rotor assemblies are used in turbine fans and turbine pumps. Also, turbine flow meters utilize driven rotor assemblies to measure volumetric fluid flow.

In a typical application, such as a turbine flow meter, a free turning rotor assembly having a plurality of rotor blades angled with respect to the direction of fluid flow is used. Fluid flow through the meter impacts the angled rotor blades thereby causing the rotor assembly to spin. In theory, the angular velocity of the rotor assembly is directly proportional to the volumetric flow rate of the fluid through the meter.

It is known that the angular velocity of the rotor assembly for a given flow rate is determined by, among other factors, the energy transferred from the moving fluid to the rotor assembly. In general, it is preferred to transfer the greatest amount of energy to the rotor assembly without unduly or adversely affecting the properties of the fluid. In other words, it is desired to transfer energy from the fluid to the rotor assembly in the most efficient manner possible with as little unrecoverable energy loss as possible.

The present invention is directed to a laminated rotor with rotor blade overlap that increases the amount of energy that can be transferred from or to a fluid and that increases the efficiency at which the transfer occurs.

SUMMARY OF THE INVENTION

In one aspect of the present invention, a laminated rotor assembly is provided that comprises a plurality of laminates. Each of the laminates further comprises integral rotor blades and associated shafts. Each rotor blade and each shaft have a center mass, and the centers of mass for a blade and an associated shaft are offset from one another by a predetermined amount. The rotor blades are angled at a predetermined amount with respect to a hub portion of the rotor assembly. The laminates are adjoined such that the resulting laminated rotor assembly is closed.

In another aspect of the present invention, a laminated rotor is provided that comprises a first laminate and a second laminate. Each laminate further comprises a plurality of substantially radially extending rotor blades and offset shafts. Each rotor blade on the first laminate is oriented to form a first angle with respect to a planar surface on the first laminate. Each rotor blade on the second laminate is oriented to form a second angle with respect to a planar surface on the second laminate. The first laminate and second laminate are fixed together such that the rotor blades of the first laminate overlap with rotor blades of second laminate.

Yet another aspect of the present invention is provided by a laminated rotor assembly that comprises laminates having substantially equal thicknesses. Each laminate has a planar surface. Each laminate has a plurality of rotor blades integral therewith, with each rotor blade having associated therewith a blade shaft. Each rotor blade is rotated about each associated blade shaft to a predetermined angle with respect to the planar surface. Each rotor blade is offset by a predetermined offset from each associated blade shaft such that adjacent rotor blades of said laminated rotor assembly overlap.

Still further, another aspect of the present invention provides a method of fabricating a closed rotor assembly comprising the steps of providing a plurality of rotor assembly blanks. Rotor blades and blade shafts are formed into the blank such that the center of mass of a rotor blade is offset from the center of mass of the associated shaft. The rotor blades are twisted to a predetermined angle with respect to a hub portion of the blank and the hub portions are joined together to form a closed rotor assembly.

DESCRIPTION OF THE PREFERRED EMBODIMENT

Figure 1:
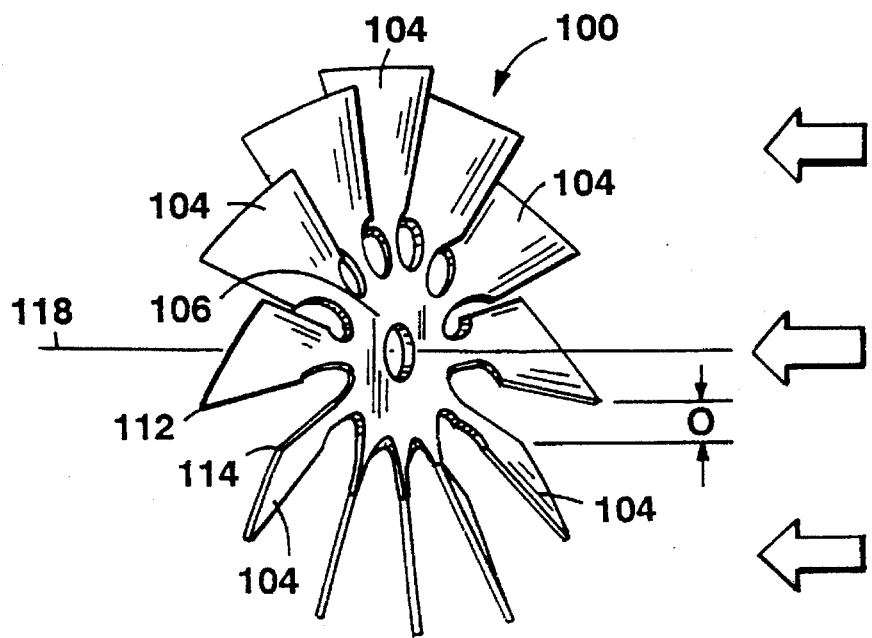
FIG. 1 is a perspective view of a non-laminated rotor assembly.
Figure 2:
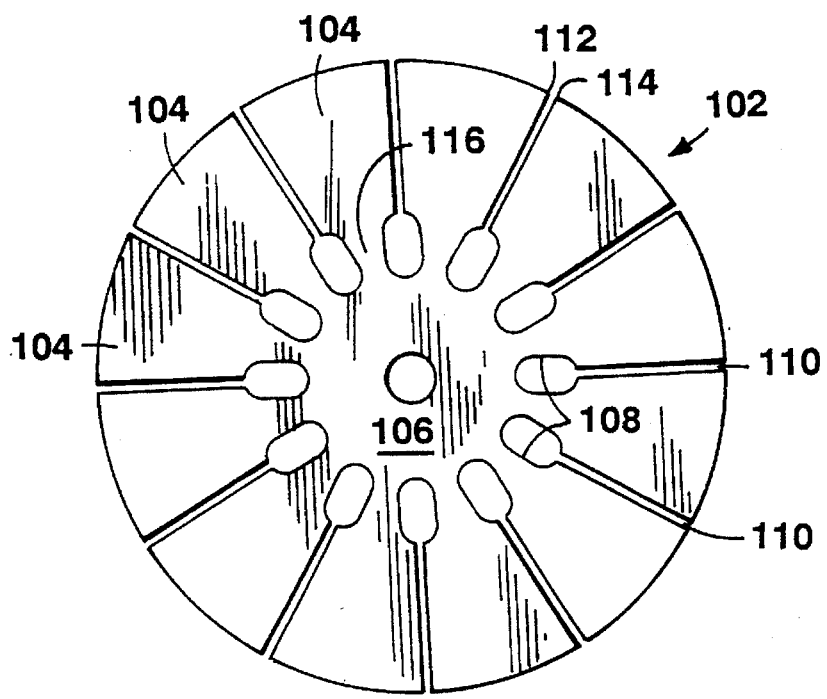
FIG. 2 is a plan view of a non-laminated rotor blank.

Shown in FIG. 1 is a non-laminated rotor assembly 100. The non-laminated rotor assembly 100 is fabricated from a single, circular blank of metal 102 or other material suitable for use as a rotor assembly. FIG. 2 shows a non-laminated rotor blank 102 before the individual rotor blades 104 are angled with respect to the rotor hub 106.

As can be understood by referring to FIGS. 1 and 2, a non-laminated rotor assembly 100 can be fabricated from a single circular blank 102 by selective placement of notches 108 and channels 110. Once individual rotor blades 104 have been formed in the circular blank 102, the rotor blades 104 can be twisted about blade shaft 116 to a predetermined angle with respect to the rotor hub 106 as shown in FIG. 1. For purposes of this disclosure, fluid flow is assumed to be from right to left as indicated by the hollow arrows in FIG. 1. It will be understood that rotors of the type shown in FIG. 1 and the laminated rotor assemblies disclosed and claimed herein are capable of bi-directional service.

The rotor assembly shown in FIG. 1 is known as an "open" rotor assembly. The rotor assembly is "open" because the leading edge 114 of one rotor blade 104 does not overlap the trailing edge 112 of an adjacent rotor blade 104. Rotor blade overlap is not possible in the rotor assembly of FIG. 1 because, among other things, material is removed in forming the channels 110.

When the rotor assembly 100 of FIG. 1 is viewed from its longitudinal axis, 118, blades 104 are separated by a gap "O". The width of gap "O" is equal to the width of channels 110 plus an amount dependent upon the width of blades 104 and the angle of the rotor blades with respect to the rotor hub 106. When fluid flows axially (i.e., substantially parallel to the longitudinal axis 118) onto rotor assembly 100, the gaps "O" introduce non-linear components into the theoretically linear relationship between the flow rate of fluid and the angular velocity of the rotor assembly 100. These non-linearities are thought to be due to unrecoverable energy loss caused by gaps "O".

A "closed" rotor assembly, in contrast, is a rotor assembly in which there are no gaps between the trailing edge and leading edge of adjacent rotor blades. In other words, the trailing edge of one rotor blade overlaps the leading edge of an adjacent rotor blade. In the context of this disclosure, "overlap" is defined to include that condition where the trailing edge of one rotor blade and the leading edge of an adjacent rotor blade exist in a common longitudinal plane, i.e., where the physical blade overlap approaches (and equals) zero.

Figure 3:
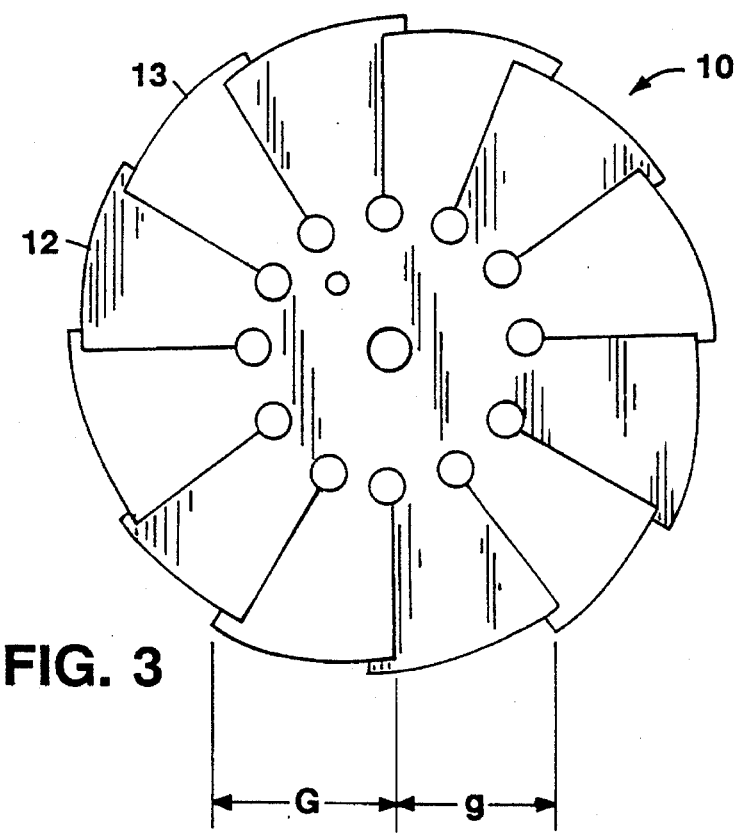
FIG. 3 is a plan view of a laminated rotor assembly of the present invention.
Figure 4:
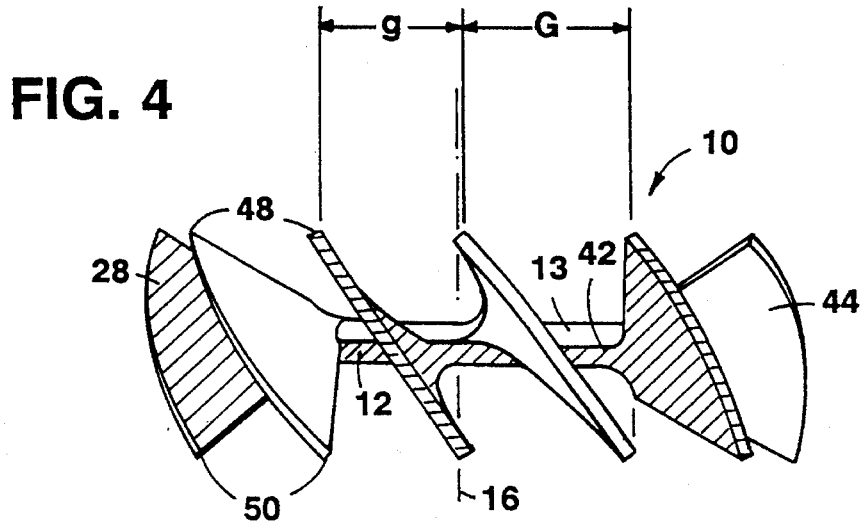
FIG. 4 is a perspective view of a laminated rotor assembly of the present invention.

FIGS. 3 and 4 show a laminated rotor assembly 10 of the present invention. As can be seen from these figures, a laminated rotor assembly of the present invention can have rotor blade overlap ranging from zero to full blade width and beyond. Rotor blade overlap can be defined in terms of a solidity ratio S. When S=1, the gap between adjacent blades is zero and the blades just begin to overlap. For values of S less than 1, the rotor assembly is considered to be "open". Thus, closed rotor assemblies satisfy the following criteria: $1 \leq S \leq \infty$. As shown in FIGS. 3 and 4, S is defined as:

$$S = G/g$$

The laminated rotor assembly of the present invention will be described with reference to a specific twelve-bladed laminated rotor assembly for a 2" gas turbine flow meter. It will be appreciated that the laminated rotor assembly of the present invention has application well beyond turbine flow meters and is not limited to twelve-bladed rotor assemblies or 2" gas turbine meters. This description is meant to illustrate a preferred embodiment of the present invention and is not to be interpreted as limiting the invention.

Figure 5:
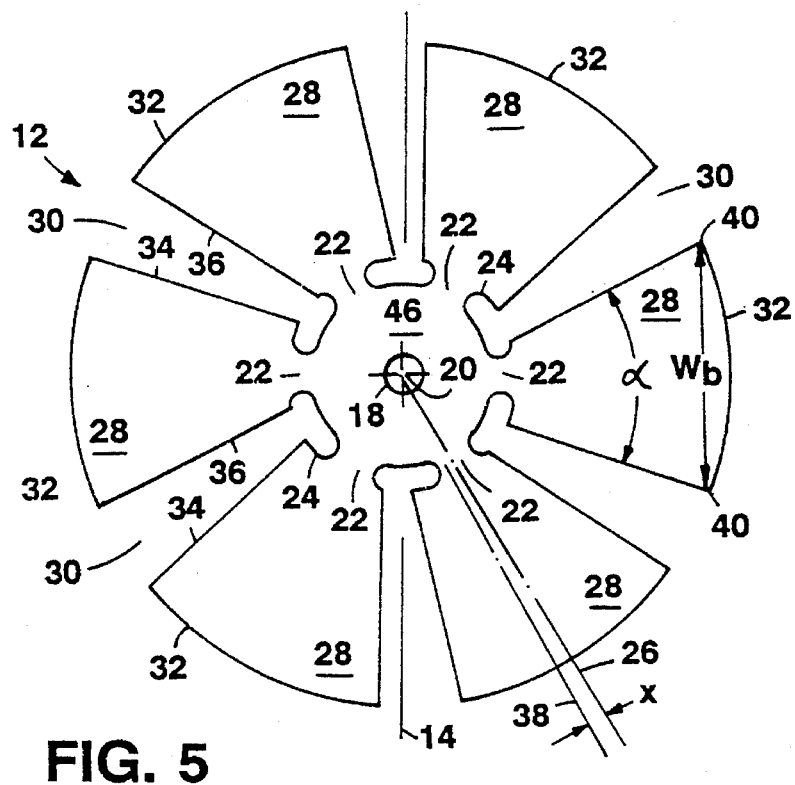
FIG. 5 is a plan view of a first laminate of the present invention.
Figure 6:
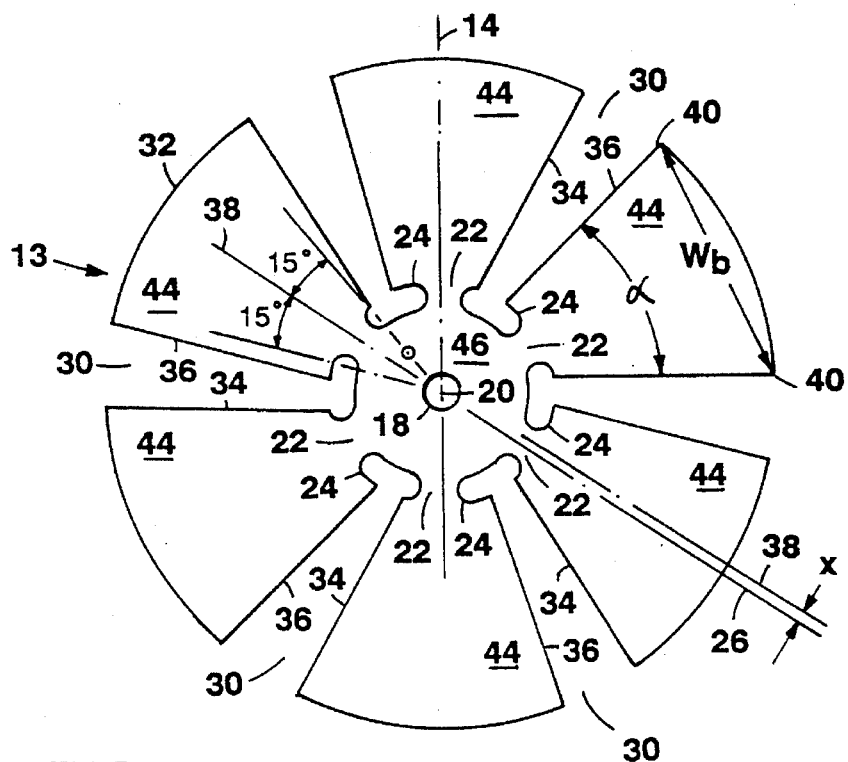
FIG. 6 is a plan view of a second laminate of the present invention.

The twelve-bladed laminated rotor assembly 10 is comprised of two, six-bladed laminates 12 and 13, each of which is a quasi-rotor assembly. Referring now to FIGS. 5 and 6, a first laminate 12 is formed from a circular rotor blank that has a radial axis 14 and a longitudinal axis 16 (see FIG. 4). The rotor blank is preferably disc-shaped and may be formed from stock using a stamping die, but preferably is formed by milling or laser cutting. It has been found that sharp edges are preferable on the rotor assembly 10. A stamping die typically does not allow the formation of sharp edges that milling or laser cutting provides. A center hole 18 is formed at the center 20 of the first laminate 12 and the second laminate 13.

Six rotor blade shafts 22 are formed by introducing six generally elliptical notches 24 about the center 20, such that the rotor blank material between adjacent notches forms a rotor blade shaft 22. Each rotor blade shaft 22 has a centerline 26 that passes through the center of gravity of each rotor blade shaft 22 and the center 20. The notches 24 are generally equidistant from adjacent notches and equidistant from the center 20, such that blade shafts 22 are substantially similar in shape and position.

Six rotor blades 28 are formed by introducing six channels 30 into the first laminate 12. Six rotor blades 44 are similarly formed in the second laminate 13. The channels 30 are oriented substantially radially outward from the outer portion of each notch 26 to outer circumference 32 of the laminates 12 and 13. The channels 30 form the trailing edge 34 and the leading edge 36 of adjacent rotor blades 28 and 44. (It will be understood that the terms leading edge and trailing edge are relative terms dependent upon the direction of fluid flow. In this disclosure, fluid flow is assumed to be from right to left and into the page, as applicable). Each rotor blade 28 and 44 has a centerline 38. Each rotor blade 28 and 44 has substantially the same width as the other rotor blades. Rotor blade width Wb is herein defined to be the straight-line distance between rotor blade tips 40 (known from basic geometry to equal $$d \sin(\alpha/2)$$

where d is the diameter of the laminate 12 and $\alpha$ is the angle formed by the leading edge 36 and the trailing edge 34 of a rotor blade 28 or 44).

Because the twelve-bladed laminated rotor assembly 10 of the present invention is comprised of two six-bladed laminates 12 and 13, each rotor blade centerline 38 must pass substantially through the interface 42 (see FIG. 4) between the two laminates. To effect this structure, the channels 30 are formed such that the rotor blade centerlines 38 are offset from the rotor blade shaft centerlines 26 by a predetermined amount x.

Figure 7:
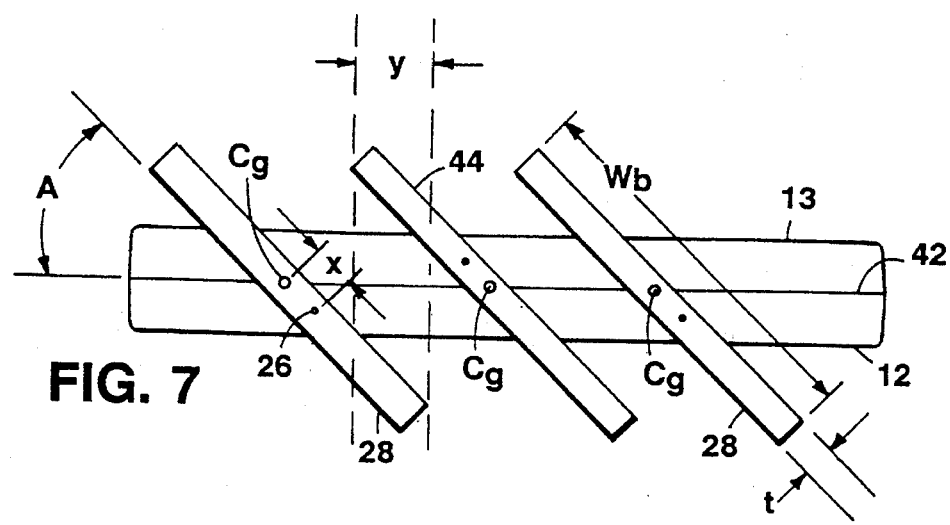
FIG. 7 is a graphical depiction of the laminated rotor assembly shown in FIG. 3.

As shown in FIGS. 5 and 6, offset x between the rotor blade centerlines 38 and the rotor blade shaft centerlines 26 causes each rotor blade 28 and 44 to have a center-of-mass, $C_b$, which does not lie on rotor blade shaft centerline 26, but rather in the interface plane between the two laminates 42 (when assembled, see FIGS. 4 and 7). It is important to note that offset x of blades 28 of the first laminate 12 is in the opposite direction of offset x of blades 44 of the second laminate 13.

The offset x provides several important structural attributes. First, the offset x provides a uniform overlap between the rotor blades of the first and second laminates, thereby permitting the fabrication of a "closed" rotor assembly. Thus, this overlap substantially eliminates the non-linearities due to "open" rotor assemblies. Second, the offset x aligns the rotor assembly blades in planes parallel to the planar surface of the laminate hub 46; in other words, forward tips 48 of blades 28 and 44 all lie in one plane while rearward tips 50 of blades 28 and 44 all lie in another plane. (See FIG. 4) Third, offsetting each rotor blade places the center-of-mass, $C_b$, of each rotor blade 48 over interface 42 (FIG. 7).

FIG. 7 is a quasi cross-sectional view of laminated rotor assembly 10 of FIG. 3. FIG. 7 graphically depicts the structural relationships that produce offset x and the concomitant overlap y for the twelve-bladed laminated rotor assembly 10 constructed from two six-bladed laminates 12 and 13. It is seen in FIG. 7 that blade width $w_b$ (as defined earlier) and angle of rotation A of rotor blades 28 and 44 determine overlap y, according to the following equation:

$$y \approx W_b \cos(A) - \frac{\pi d}{n}$$

where y=blade overlap;
$W_b$=tip-to-tip blade width;
A=angle of blade rotation;

d=nominal diameter of the laminate; and
n=total number of blades.

It is also shown in FIG. 7 that angle of rotation A of blades 28 and 44 and thickness t of rotor blades 28 and 44 determine offset x, according to the following equation:

$$x = \frac{t(N_L - 1)}{2\sin(A)}$$

where x=blade offset;
t=nominal laminate thickness;
$N_L$=number of laminates in rotor assembly; and
A=angle of blade rotation.

It will be appreciated that for the two laminate rotor assembly discussed above, the offset equation reduces to:

$$x = \frac{t}{2\sin(A)}$$

For laminated rotor assemblies with more than two laminates, the calculation of offset x depends on the laminate under consideration. For example, for a three laminate rotor assembly, the two outer most laminates have the same, finite offset, but the inner laminate has an offset of zero. The following chart shows this trend for multi-laminate assemblies:

| Total No. Laminates | Order of Laminates | Value of $N_L$ |
| --- | --- | --- |
| 3 | 1 | 3 |
|   | 2 | 1 |
|   | 3 | 3 |
| 4 | 1 | 4 |
|   | 2 | 2 |
|   | 3 | 2 |
|   | 4 | 4 |
| 5 | 1 | 5 |
|   | 2 | 3 |
|   | 3 | 1 |
|   | 4 | 3 |
|   | 5 | 5 |
| 6 | 1 | 6 |
|   | 2 | 4 |
|   | 3 | 2 |
|   | 4 | 2 |
|   | 5 | 4 |
|   | 6 | 6 |

In the preferred embodiment, described herein, rotor blades 28 and 44 are formed similarly and in such a way that gaps between blades 28 and 44 are just eliminated. In other words, overlap y substantially equals zero, but is not negative (i.e., S=1). However, laminated rotor assemblies of the present invention can be fabricated with any desired amount of overlap y. Also, the above equations may be modified to describe laminated rotors assemblies of the present invention constructed from more than two laminates.

The laminated rotor assembly of FIG. 3 is comprised of two laminates 12 and 13 that are constructed from AISI 430 stainless steel having a thickness t of 0.032" and a diameter d of 2". The notches 24 are formed such that the centers of curvature of each notch end is 0.437" from center 20 and 15° from each blade shaft centerline. The width of the notches 24 is 0.093". Each of the laminates 12 and 13 has six rotor blades 28 and 44, respectively. Each rotor blade consumes 45° of the circumference of each laminate. Therefore, the channels 30 are formed such that 15° separates adjacent blade sections on each laminate.

The angle of rotation A of the rotor blades in the preferred embodiment shown in FIGS. 3 and 4 is 45°. The offset x equals 0.023". Therefore, rotor blade centerline 38 is established by a parallel offset of 0.023" from the blade shaft centerline 26. It is important to remember to offset all rotor blade centerlines 38 on the first laminate in the same direction and in the opposite direction on the second laminate. Once rotor blades 28 and 44 are angled, laminates 12 and 13 are mated together and aligned according to alignment holes 52.

The planar surfaces (hubs 46) of the first and second laminates 12 and 13 are coaxially adjoined at interface 42, as shown in FIGS. 3, 4 and 7, such that blades 44 of the second laminate are positioned between rotor blades 28 of the first laminate. Properly positioned rotor blades 44 will have an overlap y (FIGS. 4 and 7) with rotor blades 28 of the first laminate. To ensure proper positioning of each laminate, alignment holes 52 are formed into laminates 12 and 13. When laminates 12 and 13 are properly aligned, the coaxially aligned alignment holes 52 are filled with a bonding agent, preferably by welding, although any other suitable bonding or joining technique may be used. In this manner, the individual laminates 12 and 13 are joined to fashion the laminated rotor assembly 10 of the present invention.

Although the preferred embodiment described herein comprises a twelve-bladed laminated rotor assembly in which all rotor blades are of equal width, many variations may be used without departing from the spirit of the present invention. For example, the present invention contemplates rotor assemblies comprised of three, four, five, even six or more laminates. The laminates used with the present invention need not be of similar thickness, constant thickness, or similar material. The rotor blades on a laminate may or may not have the same width and/or angle of rotation. The rotor blades of one laminate may be oriented at 30° while the rotor blades of a second laminate may be oriented at some other angle. Rotor blades on a given laminate or on a given laminated rotor assembly can be of different radial lengths, if desired. Those of ordinary skill in the art having benefit of this disclosure will be able to modify the relationships given above to these various embodiments without undue experimentation.

Figure 8:
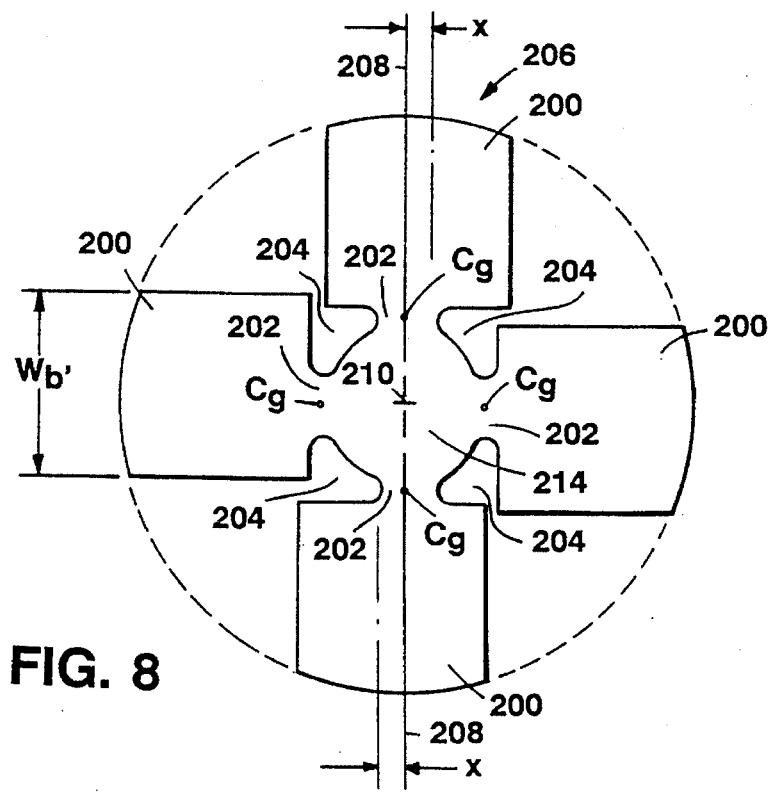
FIG. 8 is a plan view of an alternate embodiment of a laminate of the present invention.

Shown in FIG. 8 is one of many alternate embodiments of the present invention. In the laminate shown in FIG. 8 each rotor blade 200 has a substantially constant width $W_b'$ along the radial length of the rotor blade.

Similarly to the laminated rotor assembly shown in FIG. 3, rotor blade shafts 202 are formed, preferably, by milling or laser cutting notches 204 into blank 206. The center of mass $C_S$ for each rotor blade shaft 202 preferably lies along a radial axis 208 that passes through the center 210 of the rotor laminate. Rotor blades 200 are formed by removing excess blank 206 material between adjacent blades as shown in FIG. 8. The location of rotor blades 200 with respect to rotor blade shafts 202 is determined similarly to the disclosure given above. Specifically, the laminate shown in FIG. 8 can be used to fabricate a twelve-bladed, three-laminate, rotor assembly (see FIG. 9). If the angle of blade rotation A' is selected to be 30° and the thickness, t, of each laminate (i.e., the first, second and third laminate) is substantially 0.125 inches, offset x' for the first and third laminate is determined by:

$$x'_{1,3} = \frac{t(N_L - 1)}{2\sin(A')} = \frac{(0.125)(3 - 1)}{2\sin(30°)} = 0.25$$

where $N_L$=the number of laminates. It will be appreciated that the offset $x_2$ for the second laminate (i.e., the middle laminate) is zero and that the offset for the third laminate is the same as that for the first laminate (0.25") but is in the opposite direction.

Figure 9:
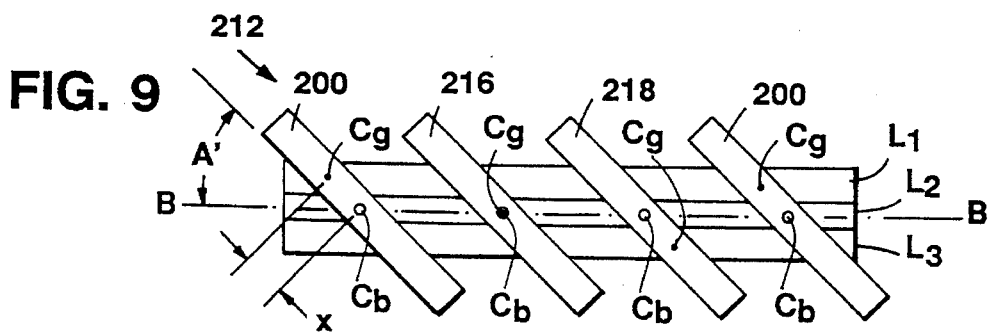
FIG. 9 is a graphical depiction of a laminated rotor assembly of the present invention utilizing the laminate of FIG. 8.

FIG. 9 is a graphical depiction of the twelve-blade, three-laminate rotor assembly formed using the laminate of FIG. 8. The first laminate is designated $L_1$ and includes rotor blade 200. The center of mass for the blade shaft, $C_S$, for each rotor blade 200 is seen to lie in a plane at the mid thickness of laminate $L_1$. The center of mass of each rotor blade, $C_b$, is seen to line in a plane B—B that divides the rotor assembly 212 (specifically, the rotor assembly hubs 214) in half.

Rotor blade 216 is associated with the second or middle laminate, $L_2$. The centers of mass of each associated blade shaft, $C_S$, and rotor blade, $C_b$, are coincident and also lie in plane B—B.

Rotor blade 218 is associated with the third laminate, $L_3$. The center of mass of the blade shaft, $C_S$, associated with rotor blade 218 lies in a plane at the mid thickness of laminate $L_3$. The center of mass of the rotor blade 218, $C_b$, is offset by x=0.25" so that $C_b$ lies in plane B—B.

Thus, once the present invention is understood according to the foregoing disclosure, it will be appreciate that laminated rotor assemblies comprising two or more laminates with rotor blade overlap from 1 to ∞ can be fabricated. To the extent that laminated rotors beyond those described above would be desired, the above description shall not limit the scope of the present invention. Instead, the inventors intend for the scope of the invention to be the maximum allowed under the law in view of the following claims.

What is claimed is:

1. A laminated rotor assembly, comprising:
   a plurality of laminates, each of said laminates comprising integral rotor blades and associated shafts;
   each rotor blade and each associated shaft having a center of mass;
   said centers of mass for each rotor blade and said centers of mass for each associated shaft being offset by a predetermined amount;
   each of said rotor blades angled at a predetermined amount with respect to a hub portion of said rotor assembly, each of said rotor blades having a leading edge portion and a trailing edge portion; and
   said plurality of laminates adjoined to form a closed laminated rotor assembly, said leading edge portions lie in a common plane, and said trailing edge portions lie in another common plane.

2. The laminated rotor assembly of claim 1, wherein said center of mass for each rotor blade lies in a common plane.

3. The laminated rotor assembly of claim 1, wherein a thickness of each of said laminates is substantially the same.

4. The laminated rotor assembly of claim 1, wherein said rotor blades are angled between 30 and 60 degrees with respect to said hub portion.

5. The laminated rotor assembly of claim 1, wherein said rotor blades on any one of said laminates are angled at substantially the same angle.

6. The laminated rotor assembly of claim 1, wherein said rotor blade angle varies among said laminates.

7. A laminated rotor, comprising:
   at least two laminates fixed together to form a closed laminated rotor;
   said first laminate, comprising a plurality of substantially radially extending rotor blades and offset shafts, said rotor blades oriented to form a first angle with respect to a planar surface of said first laminate;
   said second laminate, comprising a plurality of substantially radially extending rotor blades and offset shafts, said rotor blades of said second laminate oriented to form a second angle with respect to a planar surface of said second laminate; and
   wherein tip portions of said first laminate rotor blades and said second laminate rotor blades lie in a common plane.

8. The laminated rotor of claim 7, wherein a center of mass for each rotor blade lies in a common plane.

9. The laminated rotor of claim 7, wherein a thickness of each of said laminates is substantially the same.

10. The laminated rotor of claim 7, wherein said rotor blades are angled between 30 and 60 degrees with respect to said hub portion.

11. The laminated rotor of claim 7, wherein said rotor blades on any one of said laminates are angled at substantially the same angle.

12. The laminated rotor of claim 11, wherein said rotor blade angle varies among said laminates.

13. A laminated rotor assembly, comprising:
   laminates having substantially equal thicknesses;
   a planar surface associated with each laminate;
   a plurality of rotor blades integral with each of said laminates, each of said rotor blades having associated therewith a blade shaft, each of said rotor blades rotated about each associated blade shaft to a predetermined angle with respect to said planar surface; and
   a predetermined offset by which each said rotor blade is offset from each associated blade shaft such that adjacent rotor blades of said laminated rotor assembly overlap and adjacent tip portions of adjacent rotor blades lie in a common plane.

14. The laminated rotor assembly of claim 13, wherein said predetermined angle is between 15° and 75°.

15. The laminated rotor assembly of claim 14, wherein said predetermined angle is 45°.

16. The laminated rotor assembly of claim 13, wherein said rotor blades on any one of said laminates are angled at substantially the same angle.

17. The laminated rotor assembly of claim 13, wherein said predetermined rotor blade angle varies among said laminates.

18. The laminated rotor assembly of claim 13 wherein each of said rotor blades is substantially symmetrical about an associated blade centerline, each of said blade shafts is substantially symmetrical about an associated shaft centerline, each of said shaft centerlines is associated with one of said blade centerlines, and each blade centerline is not coincident with said associated shaft centerline.

19. The laminated rotor of claim 13, further comprising first and second means for alignment, wherein said first alignment means substantially aligns with said second alignment means upon proper alignment of said laminates as said laminated rotor assembly.

* * * * *